United States Patent [19]

Pradon

[11] 4,093,042
[45] June 6, 1978

[54] LOCKING GRIPPER

[76] Inventor: Jacques Pradon, 19, avenue de la Tourelle, 94100 - Saint-Maur-des Fosses, France

[21] Appl. No.: 733,361

[22] Filed: Oct. 18, 1976

[30] Foreign Application Priority Data

Oct. 20, 1975 France .................. 75 32025

[51] Int. Cl.² ........................... F16D 63/00
[52] U.S. Cl. ....................... 188/67; 188/189
[58] Field of Search .......... 187/88; 188/43, 44, 188/67, 188, 189

[56] References Cited

U.S. PATENT DOCUMENTS

| | | | |
|---|---|---|---|
| 1,165,583 | 12/1915 | Farmer | 188/189 |
| 2,970,445 | 2/1961 | Suderow | 188/44 X |
| 3,215,231 | 11/1965 | Lodige | 188/189 |
| 3,762,512 | 10/1973 | McIntyre | 188/189 |

Primary Examiner—Duane A. Reger
Attorney, Agent, or Firm—Haseltine, Lake & Waters

[57] ABSTRACT

A gripper for locking against an elongated body such as a cable is subjected to relative displacement along the length of the body and is capable of locking at any place therealong, the gripper comprising a rigid member, at least two jaws provided with surfaces for locking against the body and a system for locking the jaws transversely on the body by wedge effect. Each jaw is associated with two substantially parallel bearing surfaces inclined relative to the elongated body, one surface being on the associated jaw, the other on the rigid member. A rolling member is interposed between the bearing surfaces for transmission of the locking force of the associated jaw to the rigid body and at least one shoe is associated with each pair of bearing surfaces. The shoe is provided with a surface for application against one of the bearing surfaces and an elastic assembly connects each shoe to the second bearing surface to maintain the rolling member between the second bearing surface and a rolling surface provided on the shoe.

18 Claims, 13 Drawing Figures

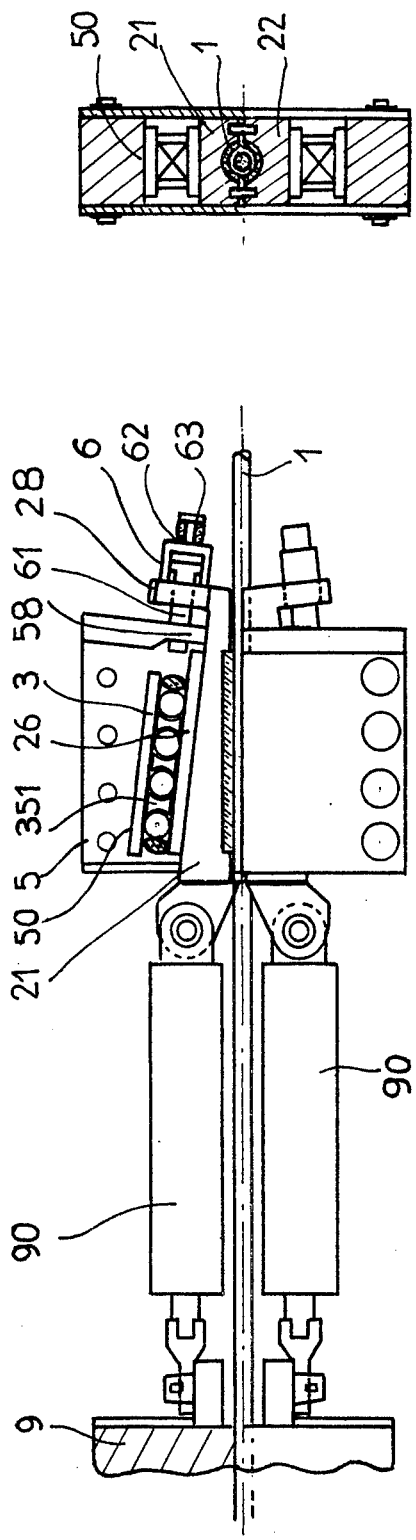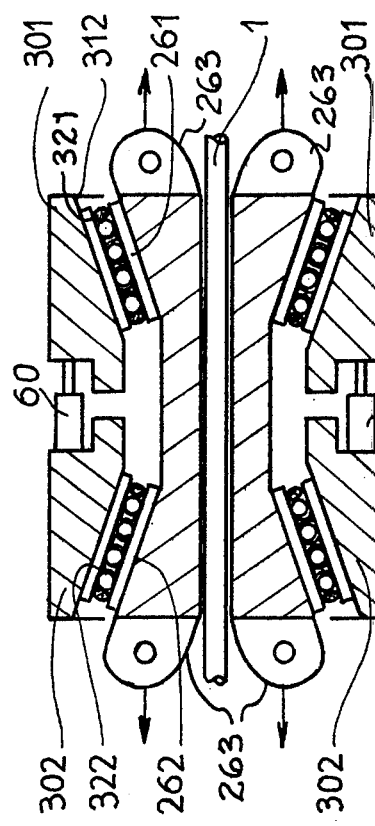

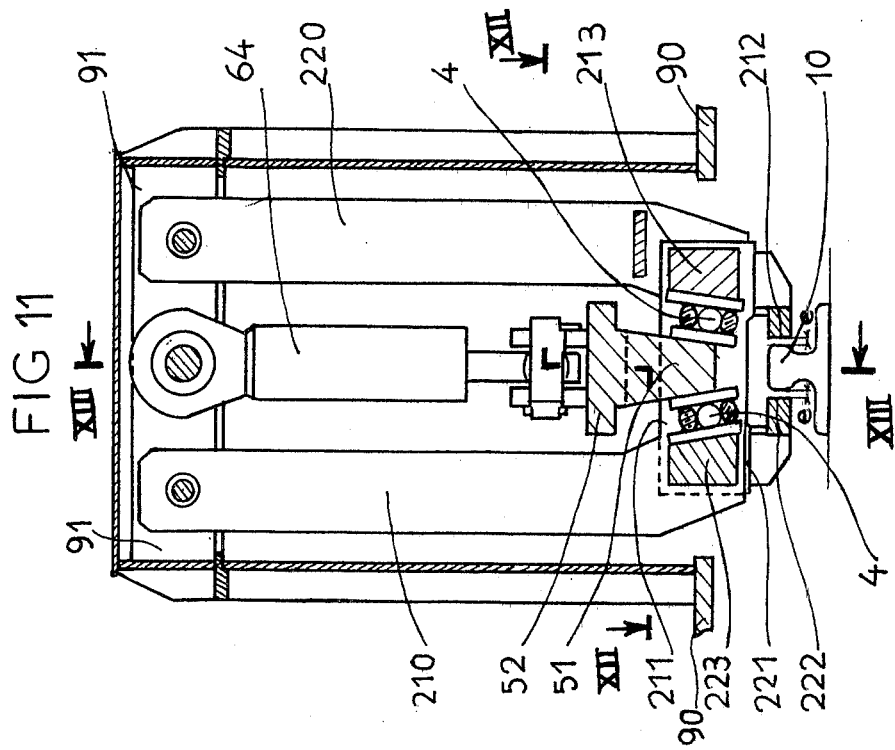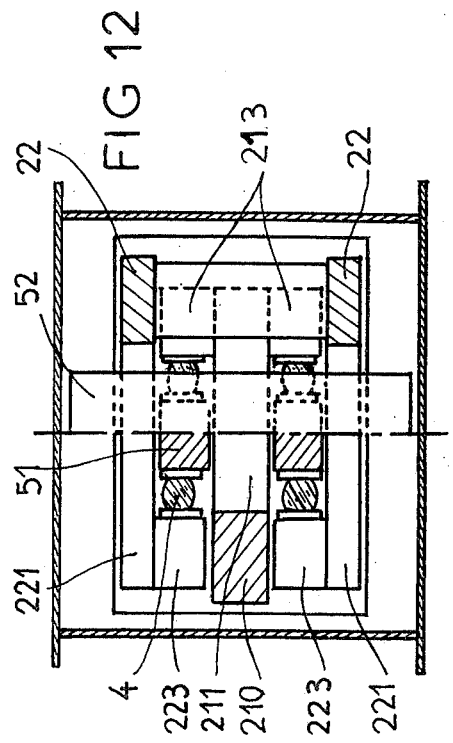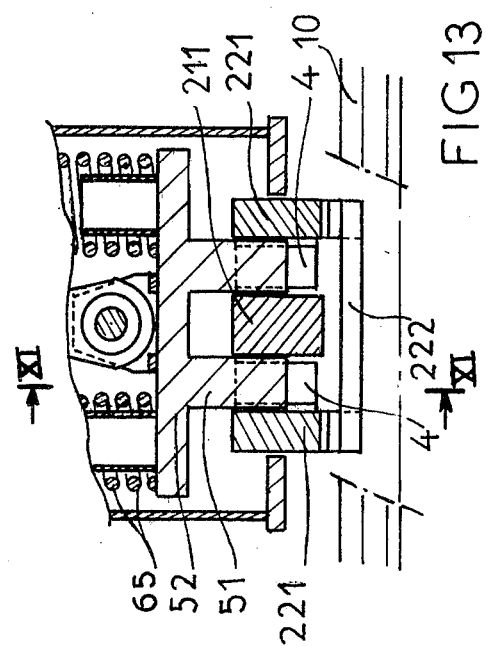

LOCKING GRIPPER

FIELD OF THE INVENTION

The invention relates to a gripper for locking on an elongated body, such as a profiled shape, for example, a plate, a tube or a cable.

BACKGROUND

Grippers are known capable of being dispaced along an elongated support and of locking itself in at least one direction of displacement at any location along the elongated body, by lockage of two jaws provided with surfaces for application on the body. The lockage is obtained by wedge effect, each jaw being associated with a pair of bearing surfaces inclined in the same direction with respect to the elongated body, one being on the jaw, the other on a rigid body fixed to the gripper. The assembly is mounted with play which permits the displacement of the gripper along the elongated body.

Generally, the displacement is possible in one direction, the displacement in the other direction producing a self-lockage of the jaws. In this regard, a rigid reaction body externally surrounds the jaws and includes two lateral sides on which are provided the inclined bearing faces and which are capable of resisting a separation force opposite the force for locking the jaws. When the gripper is displaced in relation to the elongated body in the direction of convergence of the inclined bearing surfaces, the play is eliminated and the inclined bearing surfaces form with the surfaces for application of the jaws on the elongated body a wedge which blocks the displacement of the gripper. The suppression of the play can be obtained by longitudinal displacement of one of the bearing surfaces of each pair with respect to the other by means of springs or jacks.

Of course, the displacements are relative, the elongated body being able to be displaced with respect to the gripper or vice versa. In the first case, the rigid reaction body is fixed, the gripper bearing thereon. However, the elongated body can itself be fixed, the force of displacement of the gripper then being applied to the rigid body. In both cases, the longitudinal force which the gripper is required to resist is transformed into a transverse locking force which maintains the gripper in position by friction. This force is proportional to the applied force, the factor of proportionality depending on the angle of inclination of the surfaces. It is sufficient if the resulting friction force of the jaws on the support is greater than the applied force on the gripper to obtain the blockage of the support at any point on the support whatever the load.

Such grippers are often composed of separate elements, the jaws being wedges placed between the exterior body and the support and force-fit. The unlocking can, in this case, cause difficulties.

Furthermore, it is not easy to determine at what moment, the play being taken up, the transverse locking force is integrally transmitted by the rollers and there is a risk of loss by friction.

There has also been proposed the interposition between the inclined bearing faces of members rolling on the two faces, such as cylindrical rollers or balls, which permit displacement of the jaws with respect to the exterior body in a manner to take up the play and which transmit the locking forces. This arrangement diminishes the risk of lockage but the construction of the gripper is often very complicated. On the other hand, when the gripper is opened it is not certain that the rollers return to their correct place. Additionally, the rollers can slide and flats can be formed on their surface.

SUMMARY OF THE INVENTION

In order to overcome these disadvantages, the invention has for its object a gripper with improved locking, whose operation is more certain and whose handling is easier than the grippers known up to the present.

On the other hand, the arrangement according to the invention is not only applied to self-locking grippers but can also be made the subject of other applications in which one can control the locking force.

According to the invention, each pair of bearing surfaces is associated with at least one shoe connected to one of the bearing surfaces by elastic means for support of the rolling member between the said bearing surface and a rolling surface provided on the shoe, this being provided, at the other side, with a surface for application against the other bearing surface.

BRIEF DESCRIPTION OF THE DRAWINGS

The invention is now going to be described with reference to a plurality of embodiments given by way of example and shown in the attached drawings.

FIG. 8 is a view in half longitudinal section of a gripper for controlled locking according to a variant of the invention.

FIG. 9 is a transverse sectional view taken along line IX—IX in FIG. 8.

FIG. 10 is a view of another variant of the gripper having controlled locking according to FIG. 8.

FIG. 11 is an elevational view of another particular embodiment of the invention.

FIG. 12 is a sectional view taken along line XI—XI in FIG. 10.

FIG. 13 is a sectional view taken along line XII—XII in FIG. 10.

DETAILED DESCRIPTION

Figure 1:
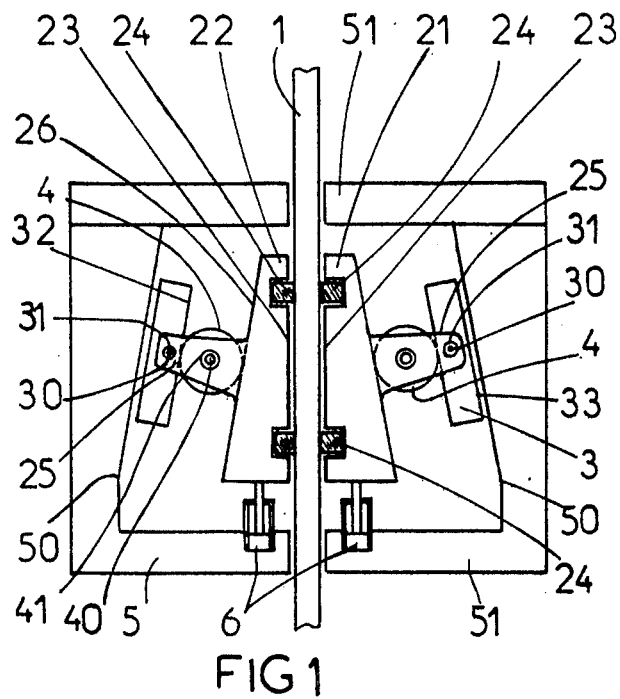
FIG. 1 is a schematic view, in longitudinal section, of a locking gripper according to the invention.

In FIG. 1 there is shown the simplest embodiment of the invention.

Therein a gripper is adapted to lock on an elongated body 1 forming a support, such as a profiled shape, a plate or a tube, or even a cable.

The gripper essentially comprises two jaws 21-22 disposed in facing relation on opposite sides of the support 1. The two jaws are provided with bearing surfaces 23 parallel to the support and whose shape is hollow and substantially identical to that of the support in a manner to be perfectly applied thereto. The bearing surfaces 23 are maintained slightly apart from the support by means of elastic members such as rubber blocks 24 or springs. The assembly can slide along the support and, for example, if rubber blocks 24 are utilized there could be composed of superposed rings pierced by a central orifice of identical section to that of the support; at least two blocks 24 are utilized in a manner to form a hollow slide.

Each jaw 21-22 is integral with a cap 25 having arms extending towards the exterior. At the extremity of the arms of each cap 25 is mounted a shoe 3 articulated on the cap 25 around an axle 30.

The axle 30 is connected to the cap with a certain play which is elastically maintained, for example, by means of elastic rings 31 interposed between the axle 30 and the corresponding orifice on the cap 25. Each jaw, 21, 22 is provided with an external surface 26 inclined with respect to the support, the inclined surfaces 26 of the two jaws 21, 22 being symmetrical and forming an angle whose apex faces in the direction in which one desires to effect the lockage of the gripper.

A cylindrical roller 4 is interposed between the inclined surface 26 of each jaw and an internal bearing surface 32 provided on each shoe 3. Each roller 4 is rotatably mounted on an axle 40 carried by the cap 25 through the intermediary of elastic rings 41.

Each shoe is provided additionally with an external bearing surface 33 which, when the gripper is in service, as shown in FIG. 1, is found slightly spaced from a bearing surface 50 extending substantially parallel to the bearing surface 26 of the corresponding jaw, the two faces 50 being provided on the lateral sides of a rigid body 5 which externally surrounds the assembly which has just been described and whose front faces 51 extending substantially perpendicular to the support, are capable of resisting a force tending to separate the inclined faces 50.

The two jaws are connected to the exterior body 5 each by a jack 6 one element of which bears against the jaw and the other element against the exterior body on the side opposite the apex of the angle formed by the inclined surfaces 26.

When the jacks are retracted, that is to say in the position shown in FIG. 1, there exists, on the one hand, between the surfaces 23 of the jaws and the support and, on the other hand, between the bearing surfaces 32 and 50 of the shoes and of the exterior support, sufficient play so that the gripper assembly can freely slide along the support 1.

When the jacks are extended, the bearing surfaces 33 of the shoes first come into contact with the corresponding surfaces 50 of the exterior body 5, then the elastic rings 31 of the axles 30 of the shoes 3 deform such that a force is transmitted by the rollers 4 and the bearing surfaces 26 to the jaws 21 and 22 which then approach one another while deforming the elastic rings 24. The bearing surfaces 23 come to be applied against the support 1. The jaws are then locked against the support with an initial force which depends on the force of the jacks. The gripper is then ready to receive forces which are resisted by the exterior body 5 and which have a tendency to displace the gripper along the support towards the apex of the angle formed by the inclined surfaces. It then produces, by wedging effect, by reason of the friction which is exerted between the bearing surfaces and the support, a locking force of the gripper on the support which is proportional to the force received by the exterior body, the relation depending on the angle of inclination of the bearing surfaces with respect to the support. The grippers are thus locked by self-lockage. The elastic deformations of the assembly are taken up by a slight displacement of the shoes with respect to the jaws which produces a small displacement of the rollers, this displacement being possible thanks to the elastic connections which are provided.

These arrangements permit effecting a take-up of the play automatically which effects proper operation even if the elements become worn. In addition, it guarantees upon unlocking of the gripper, return to the correct position of the rollers with respect to the shoes and to the jaws thanks to the elastic mounting utilized.

In effect, when the force on the exterior body is terminated, the gripper can be easily opened either by retracting the jacks 6, if these are of double action, or if the jacks 6 are single action by pulling on the exterior body in a direction opposite the applied force which has the effect of retracting the jacks; the elastic rings 24 are then spaced from the jaws in a manner to re-establish the initial play; furthermore, at the time when the force exerted by the jack is terminated, the elastic rings 31 return the shoes to the initial position, the bearing surfaces 33 and 50 being slightly spaced apart.

It is noted that the shoes 3 prevent sliding of the rollers on the exterior body in the course of the closure of the gripper. This sliding, which could be produced if the rollers directly bear against the exterior body, could produce, in time, flat surfaces on the rollers.

The principle of elastic mounting which has just been described can be realized in different fashion. One could in particular reverse that which has been shown in FIG. 1 by elastically mounting on each shoe the roller and the corresponding jaw, the jacks 6 for displacement then bearing against the shoe. One can also envisage a triple elastic connection of each assembly for transmission of forces, the shoe, the roller and the corresponding ripper being all mounted elastically on two exterior sides on which would bear the jacks 6 for closure of the gripper.

A certain number of other variations are going to be described hereafter by way of example.

Figure 2:
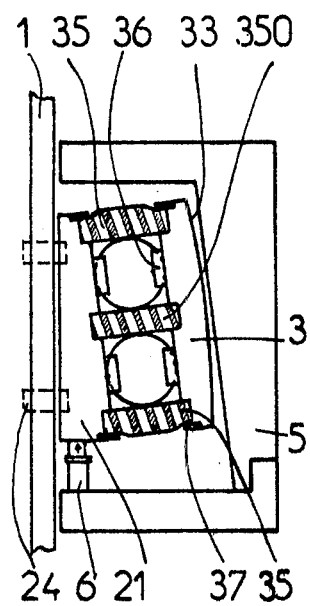
FIG. 2 is a view of a detail of a variant of the assembly for transmission of forces.
Figure 3:
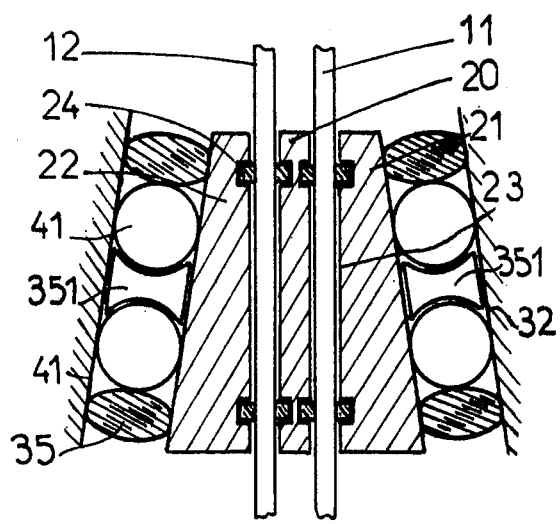
FIG. 3 is a view of a detail of a variant applied to a double support.
Figure 4:
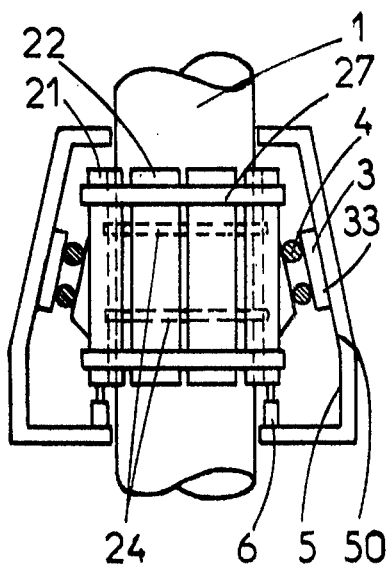
FIG. 4 is a schematic view of a variant applied to a cylindrical support.

In the examples shown in FIGS. 2, 3 and 4, a plurality of rollers are utilized in place of the single one between the shoe and the corresponding jaw. The pressure on each roller is thus reduced. The elastic mounting of the shoes, rollers and jaws can be made as in the case of FIG. 1, the axles of the rollers and of the shoes being mounted on the caps integral with the jaws through the intermediary of elastic rings. However, in FIG. 2 there is shown another embodiment of mounting in which each shoe 3 is connected to the corresponding jaw 21 (22) by means of connection blocks of elastic material 35 which effect the support of the rollers between the shoes. One can, therefore, eliminate the axles of the rollers and the shoes, the axial support being effected by simple abutments 36 provided on the jaws and the shoes.

In the case of two rollers, an intermediary block 350 is placed between the rollers and end blocks 35 secured by locking members 37.

In the case of FIG. 3, each shoe is connected to the corresponding jaw by two elastic studs 35 surrounding the rollers. These, as in known ball bearings, will be advantageously separated from one another by a cross-member 351 having a bobbin section.

The external bearing surfaces 33 of the shoes could be slightly convex to permit a small variation in the positioning of the exterior body with respect to the support at the time of lockage, while retaining a proper distribution of the force between the rollers. Of course, one can envisage utilization of more than two rollers to reduce the load resisted by each.

The gripper according to the invention can also be applied to a support comprising a plurality of parts as has been shown in FIG. 3. In this case, the support is composed, for example, of two plates or parallel tubes 11 and 12. The jaws still comprise two exterior elements 21 and 22, but interposed between the two supports 11 and 12 is an intermediary member 20 permitting locking of the jaws on the two supports. As before, the three elements 20, 21 and 22 have their bearing surfaces shaped in identical manner to the support and are maintained spaced from one another by springs or rubber blocks 24. In such an arrangement, for a given force and angle of application of the rollers, the holding force of the grippers is doubled with respect to the simple solution previously described.

The preceding examples apply to supports constituted of profiled shapes, for example, a bar or a plate. They also apply to a cable. In this case, the bearing surfaces of the jaws have a hollow cylindrical shape of a diameter equal to the exterior diameter of the cable. If it is deemed useful, one can optionally give to the bearing surfaces a hollow profile corresponding to the strands of the cable, this arrangement further augmenting the friction and consequently the intensity of lockage.

It is noted that in this case, displacement of the roller between the bearing surfaces permits absorbing the inevitable deformation of the cable between the jaws up to complete locking. This displacement being non-negligible, it is particularly important to effect, thanks to the means for elastic support of the shoe, the return to correct position of the roller at the time of unlocking of the member.

The invention applies as well to a support of large diameter such as a tube or a conduit. Thus, in the case shown in FIG. 4, there is utilized a plurality of jaws 21, 22, 23 etc . . . . distributed around the cylindrical body. The jaws are maintained in position with respect to one another by means of one or a plurality of rigid annular circular members 27 housed in slots provided in the jaws, these being, at rest, maintained in spaced relation from one another and from the support by two rubber rings.

On each of the jaws, which can be six in number as in the example shown in FIG. 4, are mounted rollers and shoes which have been previously described. The bearing surfaces 33 of the shoes are then machined in the form of frusto conical portions in order to engage in the exterior body 5 which comprises an internal bearing surface 50 in the form of a frusto conical section.

As previously indicated, jacks 6 each bearing against a jaw and against the exterior body, effect the pre-locking of the jaw and ultimately its unlocking if they are of double action.

If the gripper comprises three jaws, the equilibrium between them is automatically effected, each jaw covering substantially 120°. If there are more than three jaws, the equilibrium will be obtained due to the flexibility of the tube which will naturally have the tendency to place itself against all of the grippers, due to the fact that it is not too thick and rigid.

Figure 5:
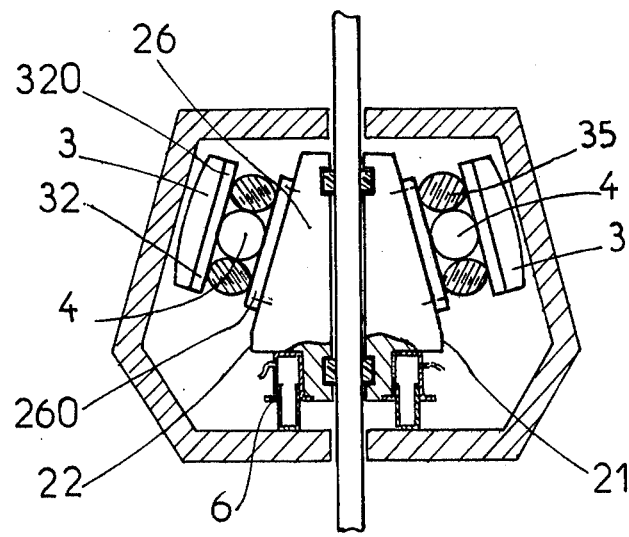
FIG. 5 shows another embodiment of the invention.

In the variant as shown in FIG. 5, the rollers are each interposed between two plates 260 and 320, one plate 260 being fixed to the jaw 26, the other, 320, being fixed to the shoe or, more simply, forming the shoe itself. For the elastic support of the roller, the two plates are connected by the studs 35. Thus, the roller and the two plates constitute an assembly which can be demounted and remounted as a unit and forms a true elastic sandwich.

Figure 6:
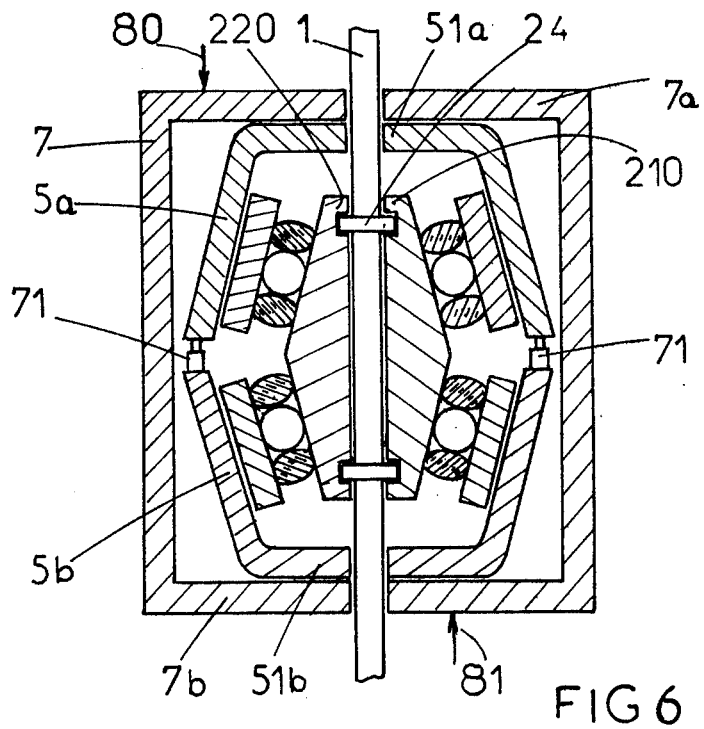
FIG. 6 is a schematic view in section of a variant employed for lockage in two directions.

The arrangements which have been described only permit the lockage of the grippers in a single direction of displacement on the support, that is to say, in the direction of closure of the wedge formed by the bearing surfaces. It is possible, however, to employ the same principle in a gripper having double action as shown in FIG. 6. This gripper comprises two locking assemblies connected at their bases and whose surfaces are inclined in opposite directions, the jaws 210 and 220 being, however, formed as a single element. Each locking assembly comprises an exterior member 5a, 5b and both are surrounded by a carriage 7 whose ends 7a, 7b can bear on the corresponding front faces 51a, 51b of the exterior body of the two locking assemblies. A clearance is, however, maintained at rest between the corresponding surfaces. The two locking assemblies are, thus, symmetrical with respect to an axis perpendicular to the plane of locking and the jaws which as previously indicated can be formed from two elements 210, 220 are maintained in spaced apart relation by the rings 24 which constitute a slide permitting sliding of the assembly along the support 1. To avoid the risk of lockage of such apparatus, two double-action jacks 71 are disposed between the exterior bodies 5a, 5b of the two assemblies. When the jacks 71 are extended, for example, to cause the front faces 51a, 51b to come into contact with the front faces 7a, 7b of the carriage, the grippers are unlocked and can freely slide the length of the support 1.

When one wishes to lock the grippers, it is sufficient to retract the jacks 71 which has the effect of relocking the various elements of the grippers by wedge effect, the corresponding bearing faces coming into contact with one another. When a displacement force is applied in one direction or the other through the intermediary of the carriage 7, this bears on the external body of the corresponding locking assembly, that is to say, on the body 5a in the direction of the arrow and on the body 5b in the direction of the arrow 81 and the corresponding locking assembly is locked in the same manner as before.

When the external forces are terminated and the exterior bodies 5a and 5b are spaced apart by means of the jacks 71, the grippers are unlocked without difficulty and undergo renewed sliding along the length of the support 1.

Of course, the variations described previously are also applicable to grippers of double action.

Figure 7:
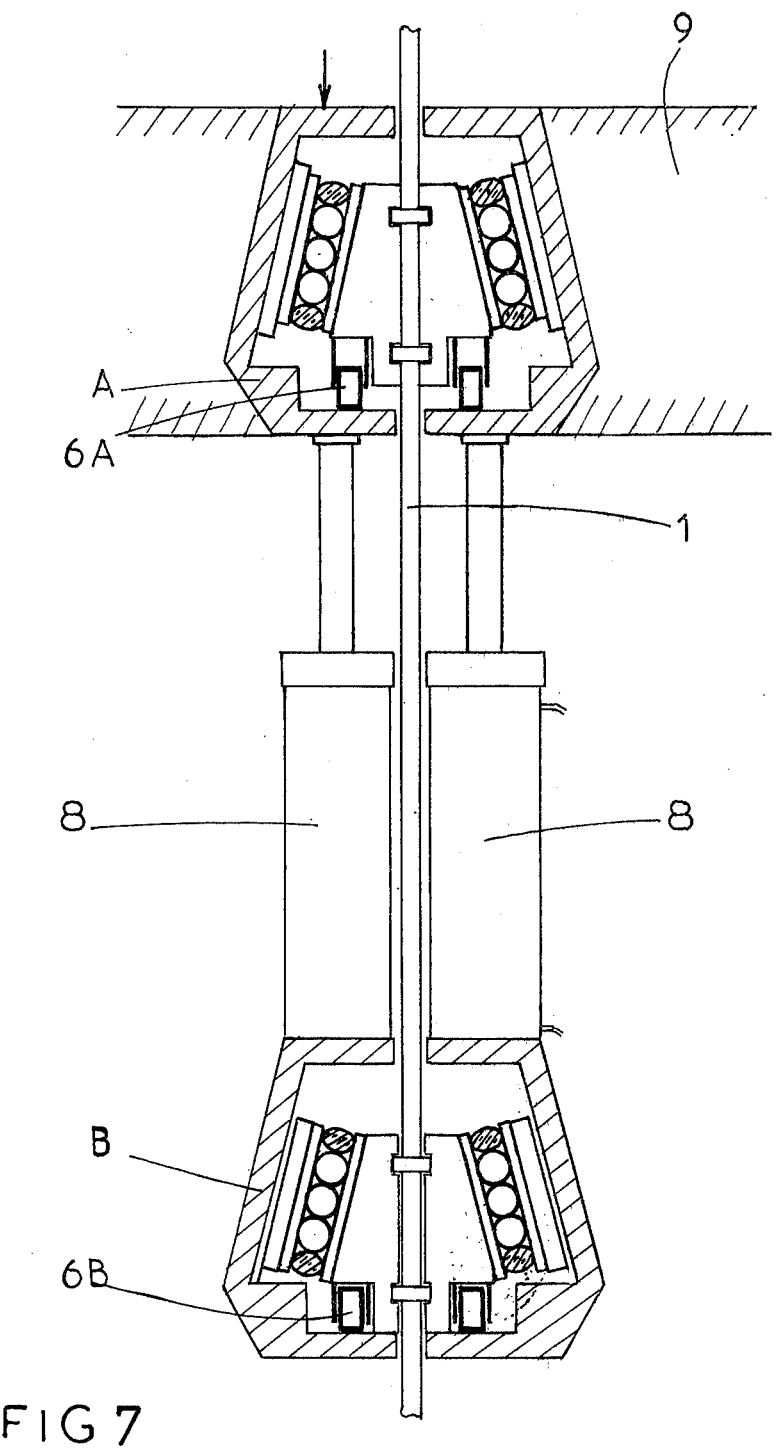
FIG. 7 is a schematic view of an installation utilizing the gripper according to the invention.

FIG. 7 shows a particular application of grippers according to the invention.

In this application, two gripping assemblies A and B are oriented in the same direction and spaced from one another along the length of the support 1, each assembly being connected to one of the elements of one or, preferably, two jacks 8. Thus, in the figure the grippers are oriented towards the top and when they are locked, consequently, they resist foces directed downwardly in the direction of the indicated arrow. The gripper A is fixed to the rods of the jacks 8 whereas the gripper B is fixed to the cylinders of the jacks.

The two grippers operate in the manner indicated previously and notably include pre-locking jacks 6. One of the grippers, for example, the upper gripper A is fixed to the load 9 to be displaced.

If the jacks 6B are extended, the gripper B locks against the support 1. The gripper A, being relaxed by extension of the jacks 8, the load 9 is raised while contacting the support 1. The jacks 6A are then extended to lock the gripper A as represented in the figure and the jacks 6B are released which unlocks the gripper B. Then by feeding the jacks in the opposite direction, the gripper B can be raised by a height equal to the travel of the jacks. By reiterating the same operation successively, it is seen that one can raise the load the length of the support 1 which can be a tube or a cable.

This solution is utilizable each time that one must raise or horizontally displace heavy loads over substantial distances without rapidity of movement. One can, for example, thus envisage the displacement of heavy platforms, scaffoldings etc.

The same arrangement can be utilized by fixing one of the grippers at a fixed point to pull or push against the tube. Thus, by fixing the bodies of the jacks 8 or the lower gripper B to the ground or on any fixed based, one can raise the support 1 over a large distance, for example, to retract a train or drilling stems. In a general manner, one can utilize this arrangement to travel great distances with forces of optionally substantial magnitude while utilizing jacks of small travel which, be consequence, can be very powerful.

In the preceding examples the locking force is created by the force which is exerted on the gripper and is proportional to this force. It is a matter, therefore, of self-locking grippers. It is noted that this type of gripper can only by adopted in the case where one is certain that the load can be lifted with displacement with respect to the support, as otherwise the phenomena of self-locking strongly immobilizing the gripper with respect to the support could produce rupture in one place or the other of the mechanism.

On the other hand, the self-locking grippers can only be utilized in one direction, in that of convergence of the inclined surfaces for wedge blocking, at least seen for utilizing double action grippers. It can, therefore, be beneficial to form grippers in which the locking is not created by the force of relative displacement of the gripper with respect to the elongated body, but in contrast with controlled lockage.

The effect of self-lockage is obtained when the force of relative displacement or the bearing reaction of the gripper is applied to the rigid reaction body. In sum, if we apply the relative displacement force on the jaws there is no longer any self-locking effect. In this case, the lockage is obtained by the relative longitudinal displacement of the bearing faces of the jaws with respect to those of the rigid reaction body. As a consequence, it is sufficient for controlling the locking force, pre-locking jacks of sufficient strength to effect not only the take-up of the play, but also to develop a sufficient locking force in order that the resulting friction force resists the external force applied on the gripper.

FIG. 8 and FIG. 9 show, by way of example, a gripper having controlled lockage according to the invention.

In the example shown, the gripper bears against the cable 1. The gripper comprises two jaws 21, 22 surrounded by a rigid exterior body 5 on which are provided inclined surfaces 50 parallel to the corresponding bearing faces 26 provided on the jaws. Between the bearing surfaces 26 and 50 is interposed an elastic sandwich, which in the embodiment previously described, comprises two plates connected by elastic studs and between which are interposed rollers separated from one another by cross members 351, one of the plates constituting the shoe 3 for application against the bearing surface 50 of the exterior body. The jaws are each provided at the side of the cable with a cylindrical recess in which there is placed a gasket for application against the cable.

The two jaws are provided on the other side with a flange 28 each facing a corresponding flange 58 fixed to the rigid body 5. The pre-locking jacks 6 each comprises an element fixed to one flange 28 and another fixed to a flange 58 but as seen they are dimensioned to effect not only the pre-locking with take-up of the play but also the locking force of the jaws. It can be advantageous, on the other hand, even if the jacks are of double action for the rod 61 of each jack to traverse the bottom of the body 62 in order to bear against the latter by an elastic ring 63 which is compressed when the jack 6 effects the lockage, in a manner to facilitate the unlocking when the jack is released.

The utilization of a double action jack avoids the placement of elastic rings between the jaws to effect their unlocking.

As seen, the relative displacement force of the gripper with respect to the cable 1 is effected by the jacks 90 each articulated on a jaw and on a base 9.

Thus, since the force for lockage is effected solely by the jacks 6, it become possible to displace the cable in one direction or the other by means of the jacks 90 by bearing against the fixed base 9, or in contrast, the cable is fixed for displacing the base 9.

In FIG. 10 there is represented a variation of the gripper having the controlled lockage of FIG. 8 comprising two opposed assemblies. In fact, in the case of a gripper having two jaws, for example, each jaw is provided with two bearing surfaces, 261, 262 inclined in opposite directions with respect to the elongated support 1 and each facing a respective parallel bearing surface 321, 322 provided on a rigid body 301, 302. The same is true of the other jaw, the bearing surfaces being inclined in the same direction being provided on the same rigid body 301 and 302 which surrounds the gripper assembly. In this case the pre-locking jacks 60 are disposed between the two exterior rigid bodies 301 and 302 and, as before, are dimensioned not only to effect the pre-lockage with take-up of play but also to apply the locking force for the jaws. It is seen, in fact, that an elongation of the jacks 60 produces lockage of the two jaws by bearing against the two exterior bodies 301 and 302. Of course, these are connected to one another in a slidable manner to permit their relative displacement.

As previously indicated, the relative displacement force of the gripper with respect to the support can be applied in both directions but the advantage is that it can be applied on one side or the other of the gripper, at one extremity or the other of each jaw as shown in the figure, each jaw being provided at its two extremities with hook portions 263, for example, connected to a jack.

It is noted that in this case the locking force is obtained by transverse bearing against the two rigid bodies and by longitudinal bearing against the jaws.

The arrangements which have just been described to effect a controlled locking of the gripper also permit realization of a gripper having progressive locking in which the locking force developed by the jacks between the rigid body and the jaws will be proportional to the force applied to the gripper. In fact, when the external forces are applied to the gripper by the hydraulic jacks, a simple hydraulic arrangement can be conceived to permit the increase of pressure in the locking jacks as a function of the pressure in the jacks developing the external forces. One can avoid, thanks to this arrangement, the unnecessary application of elevated locking forces which leads to long life of the material.

It is noted that in the grippers having controlled lockage, the operation and the advantages of the elastic sandwich are the same as the self-locking grippers.

The invention is not applied only to grippers which have just been described with reference to a plurality of examples disposed parallel to the elongated body. FIGS. 11 and 12 and 13, in fact, show, by way of example, another application in which the inclined surfaces forming the wedge are disposed transversely to the support.

The gripper which is shown in these figures is especially adapted for the lockage of a displaceable frame on rails, for example, a rolling bridge.

In FIG. 11 there is schematically shown a frame 90, for example, a rolling bridge which is displaced through the intermediary of rolling members (not shown) on rails 10. It is necessary during the raising of a load for providing lockage of the rolling bridge on at least one of these rails and the apparatus according to the invention permits the realization of a locking gripper of simple and sure operation.

The gripper is disposed at the interior of a carriage on the frame 90 and essentially comprises a beam 91 from which are suspended different members.

The jaws of the gripper are constituted by two levers 210, 220 articulated at their upper portion on axles mounted on the beam 91 and provided at their lower portions with projections, 211, 221 which cross in scissors fashion above the rail 10 and each supports a locking surface 212, 222 for the surfaces of the rail 10. Thanks to this arrangement, the lockage of the gripper will be produced by spacing apart the levers 210, 220 forming jaws.

As seen in FIGS. 12 and 13 to effect the symmetry of the locking forces, one of the levers, for example, 220, comprises two arms spaced from one another symmetrically with respect to the median plane of the gripper and connected to one another by a cross member.

The rigid reaction body is constituted by a wedge 51 provided with two surfaces inclined symmetrically with respect to the median plane and converging towards the rail 10 and mounted on a support plate 52. The assembly is suspended from a jack 64, one element of which is articulated on a cap fixed to the plate 52 and the other element of which is articulated to the beam 91 in the median plane of the gripper. Two elastic members, such as coil springs 65, are compressed between the beam 91 and the plate 52. The compression of the springs 65 is controlled by the jack 64.

As seen in FIG. 12, the wedge 51 is provided with recesses permitting the passage of projections 211 and 221 of the levers 210 and of the double action lever 220.

At their lower portion, the levers 210 and 220 are, on the other side, provided with lateral projections 213, 223 on which are provided surfaces inclined substantially parallel to the inclined surfaces of the wedge 51 which are placed relative thereto.

Between each pair of inclined bearing surfaces is placed an elastic sandwich according to the invention which comprises, as previously indicated, two plates connected to one another by elastic studs maintaining a rolling member, one of these plates being fixed on the corresponding bearing face of the lever, the other plate forming the shoe applying itself against the bearing surface of the wedge 51.

The operation of the gripper and notably of the elastic sandwiches is analogous to that which has been previously described, the length of the jack 64 being adjusted when the gripper is out of service such that there exists a play (e) between each side of the rail and the corresponding locking surface 212 or 222. In this position the levers are vertical.

The jack 64 maintains the springs 65 compressed which thus have the tendency to urge the wedge 51 towards the rail and consequently to effect the spacing apart of the jaws and the lockage of the gripper at the time when the pressure in the jack 64 is relaxed. Thus, in the case of failure in the hydraulic circuit, the gripper is automatically locked against the rail and locks the rolling bridge.

As before, as long as the play (e) is not taken up, the wedge 51 slides on the shoes of the elastic sandwiches. In consequence, when the locking surfaces are applied against the rail, the shoes are displaced by the wedge and displaced with respect to the opposed bearing surfaces while rolling on the roller members 4 to compensate for elastic deformation of the assembly.

When the jack effects raising of the wedge, the gripper is unlocked and the rollers 4 automatically return to their initial position.

The invention is not limited to the various variations which have been previously described as other varients and other applications can be imagined by utilizing equivalent means.

In a general manner, the invention is utilizable each time that it is necessary to apply a substantial longitudinal force to an elongated support and when the speed of the element is not preponderant. The support can itself be of any type whatsoever, namely a cable, a laminated element or a tube.

It is noted that in the case of the lockage of the gripper against a rail which is of U-shaped profile, the jaws are provided with surfaces for locking against the two legs of the U, the lockage being then obtained by spacing the jaws apart.

What is claimed is:

1. In a gripper for locking against an elongated body and subject to a relative displacement along the length of the body and capable of locking at any place therealong, said gripper comprising a rigid member, at least two jaws provided with surfaces for locking against the body and means for locking the jaws transversely on the body by wedge effect comprising, for each jaw, a pair of substantially parallel bearing surfaces inclined relative to the elongated body, one surface being arranged on the corresponding jaw, the other on said rigid member, and at least one rolling member interposed between said bearing surfaces for transmission of the locking force of the associated jaw to the rigid body, the improvement comprising at least one shoe associated with each pair of bearing surfaces, said shoe being provided with a surface for application against one of the bearing surfaces and elastic means connecting said shoe with the second bearing surface for maintaining the rolling member between said second bearing surface and a rolling surface provided on the shoe whereby force is transmitted between said bearing surfaces through said jaw, said roller and said shoe in succession.

2. A locking gripper according to claim 1 wherein said rigid member externally surrounds the jaws and comprises two lateral side portions on which are provided said other inclined bearing surfaces, said rigid member being capable of resisting a force tending to separate said side portions opposed to the locking force of the jaws.

3. A locking gripper according to claim 1 wherein said rigid member has the shape of a wedge interposed between said jaws, the lockage of the gripper being produced by spacing the jaws apart.

4. A locking gripper according to claim 1 further comprising means for effecting relative longitudinal displacement of one bearing surface of each pair with respect to the other, at least for pre-lockage to take-up play provided between the bearing surfaces on the rigid member and on the elongated body.

5. A locking gripper according to claim 4 wherein the longitudinal displacement means for the prelocking comprises at least one jack including one element bearing against at least one jaw and a second element bearing against the rigid member.

6. A locking gripper according to claim 4 wherein the relative longitudinal displacement means comprises means for applying a controlled locking force of the jaws on the elongated body, the force for relative displacement of the gripper along the elongated body being applied to the jaws in one direction or the other of displacement.

7. A locking gripper according to claim 1 wherein the means for locking the jaws comprises means for providing relative displacement of the gripper with respect to the elongated body by applying force to the rigid member which is transformed in the direction of closure jaws to a force of self-locking of the jaws against the elongated body.

8. A locking gripper according to claim 1 comprising means for supporting the rolling member including two spaced plates between which the rolling member is interposed and a further elastic means connecting said plates together, one of said plates constituting said shoe for application against the other bearing surface.

9. A locking gripper according to claim 1 further comprising means for elastically separating the jaws and capable of being compressed during lockage of the gripper and forming a slide along the support.

10. A locking gripper according to claim 1 wherein the elastic means for support of the rolling member between the shoe and said second bearing surface comprises a cap having two arms secured with the second bearing surface, and two axles on said arms respectively pivotably supporting said shoe and the rolling member through the intermediary of elastic rings.

11. A locking gripper according to claim 1 wherein the elastic means for maintaining the rolling member between the shoe and the second bearing surface comprises at least two blocks of elastic material connected to the shoe and to the jaw and placed on both sides of the rolling member.

12. A locking gripper according to claim 1 comprising two coupled gripper assemblies having inclined faces in opposite directions for lockage on the support, each in one direction of displacement.

13. A locking gripper according to claim 12 comprising a carriage surrounding the two locking assemblies for control of lockage by self-locking bearing against the rigid body of one of said assemblies according to the direction of displacement and on which is applied the force for relative displacement along the elongated body.

14. A locking gripper according to claim 12 further comprising means for unlocking the body by separation of the rigid body from the two locking assemblies.

15. A locking gripper according to claim 1 wherein said elongated body is a cylindrical support, said jaws being distributed around the axis of the support, a rigid element surrounding the support, and an assembly for transmission of force between said jaws and said element to said support.

16. A locking gripper according to claim 3 adapted for locking a displaceable frame mounted above a rail constituting said rigid body and comprising a carriage fixed to the displaceable frame, two pivotal levers on said carriage straddling the rail, a plate disposed between the two levers above the rail on which is mounted said rigid member in the form of a wedge, said bearing surfaces being on said levers and between which said rigid member is interposed, means for effecting vertical displacement of said plate in the direction for approach and separation of the jaws, the two levers further including surfaces for locking against the rail.

17. A locking gripper according to claim 16 wherein said levers include projections crossing in scissor fashion above the rail, the surface for locking against the rail being on said projections, each locking surface being on the other side of the rail than the lever which carries it.

18. A locking gripper according to claim 16 wherein said means for vertical displacement of the plate comprises a compression spring bearing against the carriage and against the plate in a direction for separation of the jaws and a jack for effecting compression of the spring including one element articulated to the carriage and a second element connected to the plate.

* * * * *